(12) United States Patent
Gyota et al.

(10) Patent No.: US 9,535,430 B2
(45) Date of Patent: Jan. 3, 2017

(54) AIR CONDITIONER CONTROL DEVICE, EQUIPMENT SYSTEM, AND PROGRAM

(75) Inventors: Tomoaki Gyota, Tokyo (JP); Masanori Nakata, Tokyo (JP); Noriyuki Komiya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 611 days.

(21) Appl. No.: 13/878,817

(22) PCT Filed: Jan. 25, 2011

(86) PCT No.: PCT/JP2011/051373
§ 371 (c)(1),
(2), (4) Date: Apr. 11, 2013

(87) PCT Pub. No.: WO2012/053228
PCT Pub. Date: Apr. 26, 2012

(65) Prior Publication Data
US 2013/0197699 A1     Aug. 1, 2013

(30) Foreign Application Priority Data
Oct. 18, 2010   (JP) ................................. 2010-233846

(51) Int. Cl.
G05D 23/19     (2006.01)
F24F 11/00     (2006.01)

(52) U.S. Cl.
CPC ............. *G05D 23/19* (2013.01); *F24F 11/006* (2013.01); *F24F 2011/0063* (2013.01); *F24F 2011/0067* (2013.01); *G05B 2219/2642* (2013.01)

(58) Field of Classification Search
CPC . G05D 23/19; F24F 11/006; F24F 2011/0063; F24F 2011/0067; G05B 2219/2642
(Continued)

(56) References Cited

U.S. PATENT DOCUMENTS 4,972,365 A * 11/1990 Dodds .................. G05B 19/054
                                                            700/7
5,706,460 A *  1/1998 Craig ...................... G06F 9/223
                                                            712/204
(Continued)

FOREIGN PATENT DOCUMENTS

EP     1953468 A1   8/2008
EP     2154438 A1   2/2010
(Continued)

OTHER PUBLICATIONS

International Search Report of the International Searching Authority mailed Mar. 1, 2011 for the corresponding international application No. PCT/JP2011/051373 (with English translation).

*Primary Examiner* — Kenneth M Lo
*Assistant Examiner* — Alan Chu
(74) *Attorney, Agent, or Firm* — Posz Law Group, PLC

(57) ABSTRACT

By efficiently holding only information necessary for a desired control from among information that can be obtained from equipment such as air conditioners, lighting devices and other devices, the control of the air conditioners and other devices according to the situation is obtained with small-capacity memory resources. This facilitates uploading to an air conditioner control device having a relatively small memory capacity and makes it possible to efficiently customize the installed control program.

16 Claims, 12 Drawing Sheets

(58) Field of Classification Search
USPC .......................................................... 700/276
See application file for complete search history.

(56) References Cited

U.S. PATENT DOCUMENTS

| | | | | |
|---|---|---|---|---|
| 5,896,289 | A * | 4/1999 | Struger | G05B 19/056 |
| | | | | 700/2 |
| 6,018,529 | A * | 1/2000 | Toth | H04Q 11/0471 |
| | | | | 370/463 |
| 6,160,501 | A * | 12/2000 | Tallam | G06F 21/6209 |
| | | | | 341/60 |
| 6,480,883 | B1 * | 11/2002 | Tsutsumitake | H04L 29/06 |
| | | | | 709/203 |
| 2002/0029096 | A1 * | 3/2002 | Takai | F24F 11/0086 |
| | | | | 700/276 |
| 2003/0163598 | A1 * | 8/2003 | Wilson | G06F 9/542 |
| | | | | 719/318 |
| 2005/0159848 | A1 * | 7/2005 | Shah | F24F 11/0086 |
| | | | | 700/277 |
| 2006/0253205 | A1 * | 11/2006 | Gardiner | G06F 17/28 |
| | | | | 700/19 |

FOREIGN PATENT DOCUMENTS

| | | |
|---|---|---|
| JP | 2000-320880 A | 11/2000 |
| JP | 2003-302096 A | 10/2003 |
| JP | 2003-303112 A | 10/2003 |
| JP | 2004-294028 A | 10/2004 |
| JP | 2005-044369 A | 2/2005 |
| JP | 2007-085707 A | 4/2007 |
| JP | 2008-032288 A | 2/2008 |
| JP | 2008-190853 A | 8/2008 |
| JP | 2008-304144 A | 12/2008 |
| JP | 2010-255962 A | 11/2010 |

\* cited by examiner

FIG.3

■AIR CONDITIONING CONTROL INFORMATION LIST 101

| INFORMATION ID | BIT LENGTH | REQUEST NECESSITY |
|---|---|---|
| ON/OFF | 1 | ○ |
| INTAKE TEMPERATURE | 16 | ○ |
| SET TEMPERATURE | 16 | ○ |
| OPERATION HALT | 1 | - |

FIG.4

■LIGHTING CONTROL INFORMATION LIST 102

| INFORMATION ID | BIT LENGTH | REQUEST NECESSITY |
|---|---|---|
| ON/OFF | 1 | ○ |
| BRIGHTNESS | 16 | ○ |

FIG.5

■I/O CONTROL INFORMATION LIST 103

| INFORMATION ID | BIT LENGTH | REQUEST NECESSITY |
|---|---|---|
| INPUT 1 | 16 | ○ |
| INPUT 2 | 1 | ○ |
| OUTPUT 1 | 16 | - |
| OUTPUT 2 | 1 | - |

FIG.6

■CUSTOM CONTROL PROGRAM 112

| CALCULATION COMMAND ID | INPUT 1 | INPUT 2 | OUTPUT |
|---|---|---|---|
| = 0 (REVERSAL) | D0 | - | B0 |
| = 0 (REVERSAL) | D1 | - | B1 |
| < 0 (REVERSAL) | A0 | A2 | B0 |
| < | A0 | A2 | D4 |
| < | A0 | A2 | D2 |
| < 0 (REVERSAL) | A1 | A3 | B1 |
| < | A1 | A3 | D5 |
| < | A1 | A3 | D3 |

FIG.7

■CUSTOM INPUT/OUTPUT MAP 110 (1 BIT)

| INPUT/ OUTPUT ID | PROCESS ID | EQUIPMENT ID | INFORMATION ID |
|---|---|---|---|
| D0 | LIGHTING CONTROL | 1 | ON/OFF |
| D1 | LIGHTING CONTROL | 2 | ON/OFF |
| D2 | AIR CONDITIONING CONTROL | 1 | OPERATION HALT |
| D3 | AIR CONDITIONING CONTROL | 2 | OPERATION HALT |
| D4 | I/O CONTROL | 1 | OUTPUT 2 |
| D5 | I/O CONTROL | 2 | OUTPUT 2 |

■CUSTOM CONTROL INFORMATION MEMORY 27b (1 BIT)

| VALUE (BIT ALLOCATION) |
|---|
| 1 |
| 1 |
| 0 |
| 0 |
| 0 |
| 0 |

FIG.8

■CUSTOM INPUT/OUTPUT MAP 110 (16 BIT)

| INPUT/ OUTPUT ID | PROCESS ID | EQUIPMENT ID | INFORMATION ID |
|---|---|---|---|
| A0 | I/O CONTROL | 1 | INPUT 1 |
| A1 | I/O CONTROL | 2 | INPUT 1 |
| A2 | AIR CONDITIONING CONTROL | 1 | INTAKE TEMPERATURE |
| A3 | AIR CONDITIONING CONTROL | 2 | INTAKE TEMPERATURE |

■CUSTOM CONTROL INFORMATION MEMORY 27b (16 BIT)

| VALUE (16 BIT) |
|---|
| 27 |
| 27 |
| 30 |
| 30 |

FIG.9

■BASIC INPUT/OUTPUT MAP 111

| INPUT/ OUTPUT ID | PROCESS ID | EQUIPMENT ID | INFORMATION ID |
|---|---|---|---|
| B0 | AIR CONDITIONING CONTROL | 1 | ON/OFF |
| B1 | AIR CONDITIONING CONTROL | 2 | ON/OFF |

FIG.10

■INPUT CONTROL PROGRAM

| CALCULATION COMMAND ID | INPUT A | INPUT B | OUTPUT |
|---|---|---|---|
| = 0 (REVERSAL) | 1 | - | 2 |
| = 0 (REVERSAL) | 3 | - | 4 |
| < (REVERSAL) | 5 | 6 | 2 |
| < | 5 | 6 | 7 |
| < | 5 | 6 | 8 |
| < (REVERSAL) | 9 | 10 | 4 |
| < | 9 | 10 | 11 |
| < | 9 | 10 | 12 |

FIG.11

■INPUT/OUTPUT DEFINITION INFORMATION

| I/O NUMBER | PROCESS ID | EQUIPMENT ID | INFORMATION ID |
|---|---|---|---|
| 1 | LIGHTING CONTROL | 1 | ON/OFF |
| 2 | AIR CONDITIONING CONTROL | 1 | ON/OFF |
| 3 | LIGHTING CONTROL | 2 | ON/OFF |
| 4 | AIR CONDITIONING CONTROL | 2 | ON/OFF |
| 5 | I/O CONTROL | 1 | INPUT 1 |
| 6 | AIR CONDITIONING CONTROL | 1 | INTAKE TEMPERATURE |
| 7 | I/O CONTROL | 1 | OUTPUT 2 |
| 8 | AIR CONDITIONING CONTROL | 1 | OPERATION HALT |
| 9 | I/O CONTROL | 2 | INPUT 1 |
| 10 | AIR CONDITIONING CONTROL | 2 | INTAKE TEMPERATURE |
| 11 | I/O CONTROL | 2 | OUTPUT 2 |
| 12 | AIR CONDITIONING CONTROL | 2 | OPERATION HALT |

AIR CONDITIONER CONTROL DEVICE, EQUIPMENT SYSTEM, AND PROGRAM

CROSS REFERENCE TO RELATED APPLICATIONS

This application is a U.S. national stage application of PCT/JP2011/051373 filed on Jan. 25, 2011, and claims priority to, and incorporates by reference, Japanese Patent Application No. 2010-233846 filed on Oct. 18, 2010.

TECHNICAL FIELD

The present invention relates to an air conditioner control device, equipment system and program, and more particularly, to an air conditioner control device for controlling multiple air conditioners connected to a general-purpose network, an equipment system provided with the air conditioner control device, and a program for controlling multiple air conditioners connected to a general-purpose network.

BACKGROUND ART

Equipment installed in large-scale structures such as office buildings or stores can be mutually connected via a network and can be centrally managed through a control device such as a remote controller and/or the like (for example, see PTL 1 or 2).

In general, the above-described control device accomplishes control of the various equipment in accordance with a control program uploaded to an internal memory. Consequently, when changing the control sequence of the equipment that is being controlled, it is necessary to update the control program. Hence, various art has been suggested for easily updating this type of control program (for example, see PTL 3 through 5).

CITATION LIST

Patent Literature

[PTL 1] Unexamined Japanese Patent Application Kokai Publication No. 2005-44369
[PTL 2] Unexamined Japanese Patent Application Kokai Publication No. 2000-320880
[PTL 3] Unexamined Japanese Patent Application Kokai Publication No.
[PTL 4] Unexamined Japanese Patent Application Kokai Publication No. 2003-303112
[PTL 5] Unexamined Japanese Patent Application Kokai Publication No. 2008-32288

SUMMARY OF INVENTION

Technical Problem

However, many control devices as typified by remote controllers are attached to wall surfaces in rooms or are handy types that can be carried around, and many of the devices themselves are compact. Consequently, in some cases there is little room for internal memory on which a control program can be installed, depending on the application or type of equipment that is to be controlled. In these case, there are concerns that customization of control programs in accordance with users' needs cannot be adequately accomplished.

In consideration of the foregoing, it is an objective of the present invention to enable efficient customization of a control program installed in a control device with relatively small memory capacity.

Solution to Problem

To achieve the above-described objective, the air conditioner control device according to the present invention is an air conditioner control device for controlling multiple air conditioners connected by a general-purpose network, this air conditioner control device comprising:

an air conditioner communication means for accomplishing communication with the air conditioners;

an interface for receiving information used in customizing a control program for controlling the air conditioners;

a custom control means for executing the control program;

a custom control program whose control contents are defined by the custom control means;

a custom input/output map for associating information transmittable and receivable by the air conditioner communication means with inputs/outputs of the custom control program; and a custom control information memory for storing information comprising the custom input/output map;

wherein the air conditioner communication means stores, in the custom control information memory, information extracted from received signals for information specified by the custom input/output map, and generates the signals to be sent based on the information stored in the custom control information memory; and the custom control means receives input from the custom control information memory in accordance with associations with the custom input/output map, accomplishes calculations based on the custom control program and outputs calculation results to the custom control information memory.

Advantageous Effects of Invention

With the present invention, it is possible to efficiently customize a control program installed in a control device with a relatively small memory capacity.

BRIEF DESCRIPTION OF DRAWINGS

FIG. 3 is a drawing showing an air conditioning control information list;

FIG. 4 is a drawing showing a lighting control information list;

FIG. 5 is a drawing showing an I/O control information list;

FIG. 6 is a drawing schematically showing a custom control program;

FIG. 7 is information schematically showing a 1 bit custom input/output map and custom control information memory;

FIG. 8 is a drawing schematically showing a 16 bit custom input/output map and custom control information memory;

FIG. 9 is a drawing schematically showing a basic input/output map;

FIG. 10 is a drawing schematically showing a control program that is input;

FIG. 11 is a drawing schematically showing input/output definition information;

DESCRIPTION OF EMBODIMENTS

Figure 1:
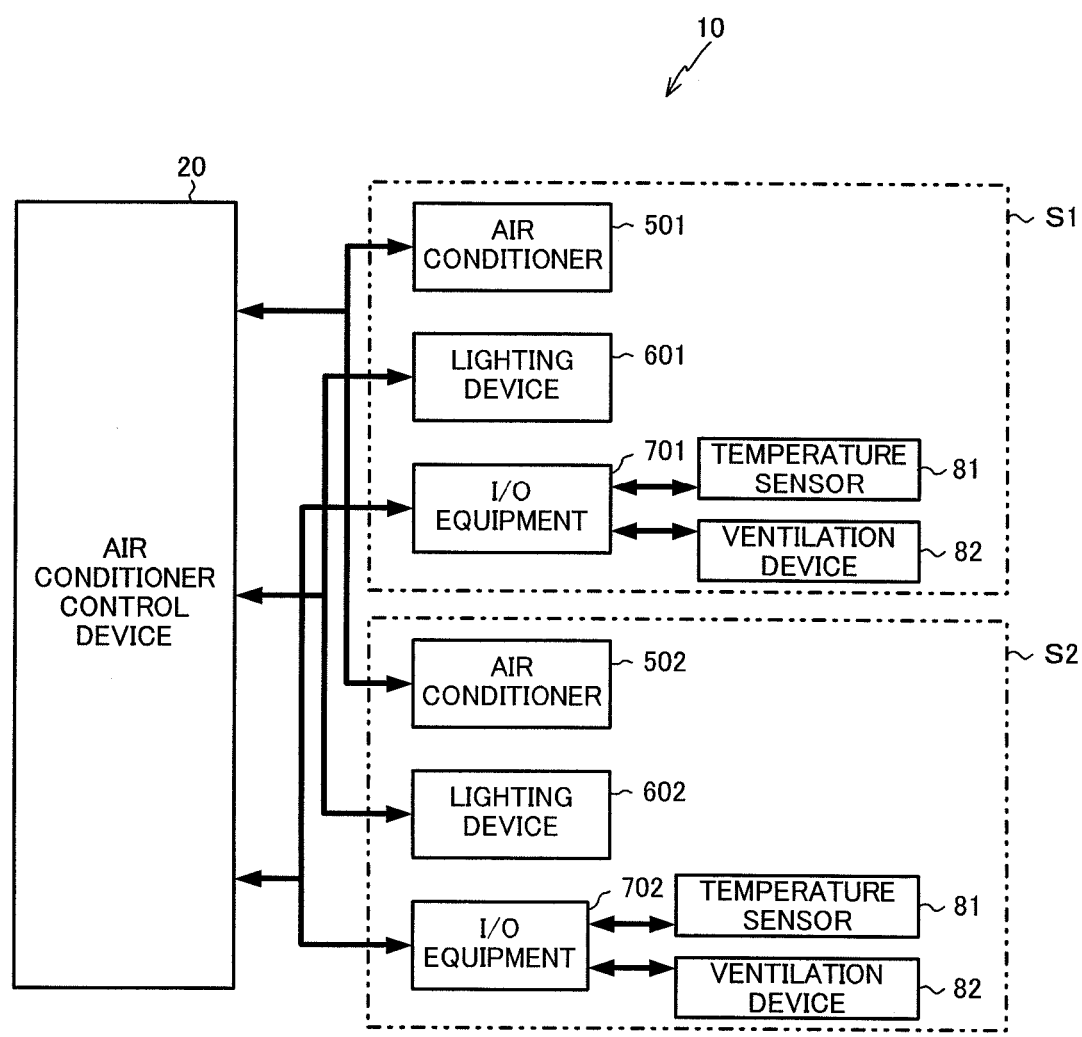
FIG. 1 is a block diagram of electrical equipment according to a preferred embodiment of the present invention.

A preferred embodiment of the present invention is described below with reference to the drawings. FIG. 1 is a block diagram of electrical equipment 10 according to this preferred embodiment. The electrical equipment 10 is equipment including, for example, air conditioners 501 and 502 and lighting devices 601 and 602 installed in a residence or office building. As shown in FIG. 1, the electrical equipment 10 comprises an air conditioner control device 20, air conditioners 501 and 502, lighting devices 601 and 602 and I/O equipments 701 and 702.

The air conditioners 501 and 502 are, for example, provided with indoor equipment positioned on the ceiling of spaces that are to be air conditioned, and outdoor equipment positioned outdoors. Furthermore, the indoor equipment air conditions the space inside of which the indoor equipment is positioned. In this preferred embodiment, the indoor equipment of the air conditioner 501 is positioned in a space S1 and the indoor equipment of the air conditioner 502 is positioned in a space S2. Furthermore, the air conditioners 501 and 502 comprise an air conditioning system 50 (see FIG. 2).

The lighting devices 601 and 602 are, for example, lighting devices whose light source is fluorescent lamps. These lighting devices 601 and 602 are positioned on the ceilings of the spaces in which the indoor equipment of the air conditioners 501 and 502 are positioned. In this preferred embodiment, the lighting device 601 is positioned in the space S1 and the lighting device 602 is positioned in the space S2. Furthermore, these lighting devices 601 and 602 comprise a lighting system 60 (see FIG. 2).

The I/O equipments 701 and 702 receives an analog signal output from a temperature sensor 81 and outputs a signal corresponding to the level of the analog signal received. In addition, the I/O equipment 701 and 702 outputs to a ventilation device 82 an operation signal for the ventilation device 82 output from an air long-term control device 20. In this preferred embodiment, the I/O equipment 701 is positioned near the indoor equipment or in the indoor equipment itself of the space S1 and the I/O equipment 702 is positioned near the indoor equipment or in the indoor equipment itself of the space S2. Furthermore, the I/O equipments 701 and 702 comprise a general-purpose I/O system 70.

The temperature sensor 81 detects the temperatures of the spaces S1 and S2. Furthermore, analog signals corresponding to the detected temperatures are output to the I/O equipment 701 and 702. An infrared temperature sensor, a thermistor and/or the like is usable as the temperature sensor 81.

The ventilation equipment 82 is positioned on the ceilings or wall surfaces of the spaces S1 and S2. The ventilation equipment 82 accomplishes ventilation of the spaces S1 and S2 based on operation signals from the I/O equipment 701 and 702. Specifically, ventilation of the spaces S1 and S2 is accomplished when the operation signal is the high level of "1" and ventilation is stopped when the operation signal is the low level of "0."

The air conditioner control device 20 is a device for accomplishing control of the air conditioners 501 and 502, the lighting devices 601 and 602 and the ventilation device 82.

Figure 2:
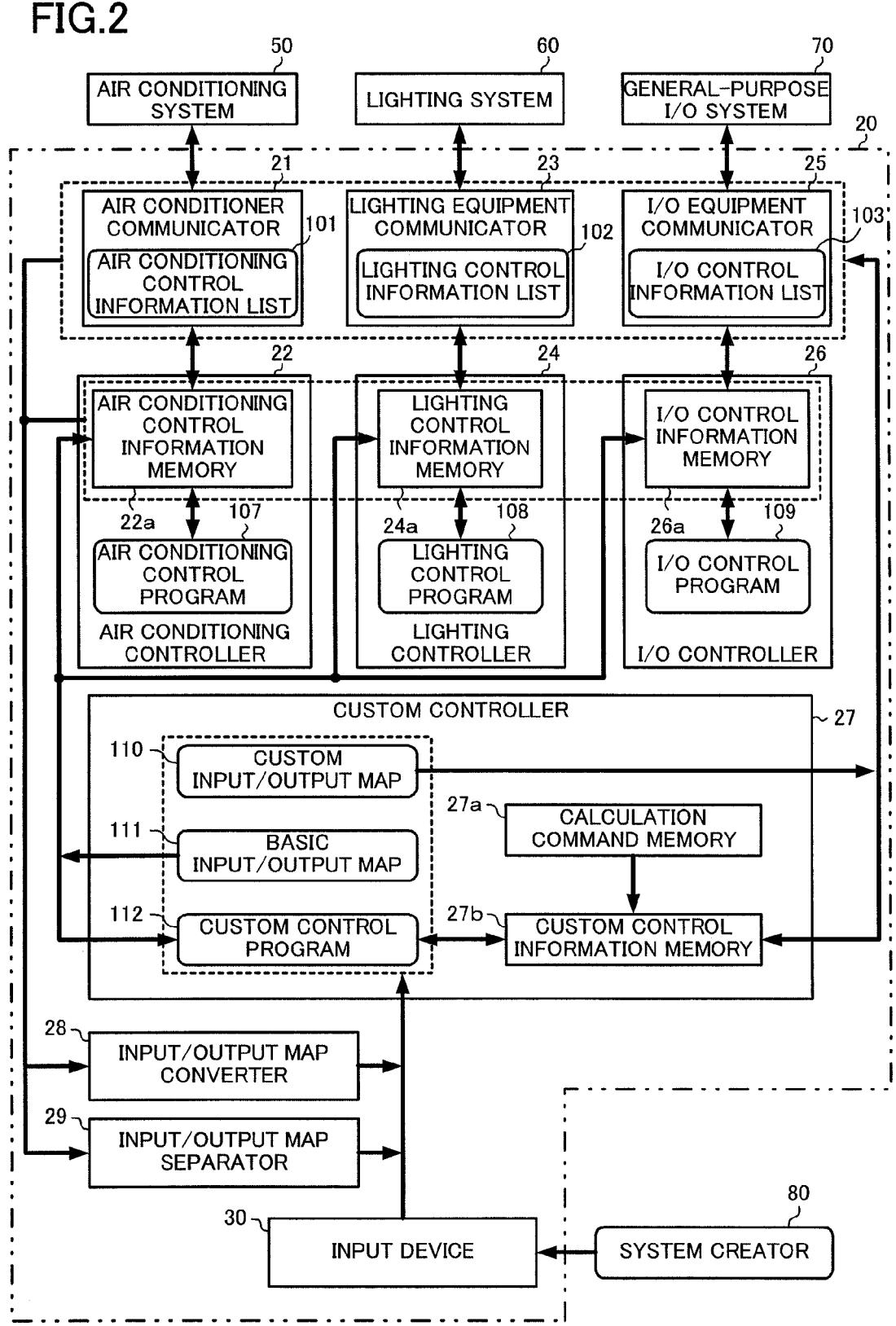
FIG. 2 is a block diagram of an air conditioner control device.

FIG. 2 is a block diagram of the air conditioner control device 20. As shown in FIG. 2, the air conditioner control device 20 comprises an air conditioner communicator 21, a lighting equipment communicator 23, an I/O equipment communicator 25, an air conditioning controller 22, a lighting controller 24, an I/O controller 26, a custom controller 27, an input/output map converter 28, an input/output map separator 29 and an input device 30.

The air conditioner communicator 21 is provided with a serial interface, a LAN (local area network) interface and/or the like. This air conditioner communicator 21 accomplishes communication with the air conditioning system 50. The air conditioner communicator 21 possesses an air conditioning control information list 101.

FIG. 3 is a drawing showing the air conditioning control information list 101. The air conditioning control information list 101 is a list related to information sent and received between the air conditioning controller 22 and the air conditioning system 50. As shown in FIG. 3, the air conditioning control information list 101 comprises an information ID, bit length and information indicating the necessity of requests. The information ID in the air conditioning control information list 101 is information indicating the ON/OFF state, the temperate of intake air, the set temperature and/or the like of the air conditioners 501 and 502. The bit length is the data length (bit length) of the above-described information ID. The necessity of requests is information indicating whether or not a request is necessary in order to acquire the information ID.

Returning to FIG. 2, the lighting equipment communicator 23 is provided with a serial interface, a LAN interface and/or the like. The lighting equipment communicator 23 accomplishes communication with the lighting system 60. The lighting equipment communicator 23 possesses a lighting control information list 102.

FIG. 4 is a drawing showing the lighting control information list 102. The lighting control information list 102 is a list relating to information sent and received between the lighting controller 24 and the lighting system 60. As shown in FIG. 4, the lighting control information list 102 comprises an information ID, bit length and information indicating the necessity of requests. The information ID in the lighting control information list 102 is information indicating the ON/OFF state, brightness and/or the like of the lighting devices 601 and 602. The bit length is the data length (bit length) of the above-described information ID. The necessity of requests is information indicating whether or not a request is necessary in order to acquire the information ID.

The I/O equipment communicator 25 is provided with a serial interface, a LAN interface and/or the like. The I/O equipment communicator 25 accomplishes communication with the general-purpose I/O system 70. The I/O equipment communicator 25 possesses an I/O control information list 103.

FIG. 5 is a drawing showing the I/O control information list 103. The I/O control information list 103 is a list relating to information sent and received between the I/O controller 26 and the general-purpose I/O system 70. As shown in FIG. 5, the I/O control information list 103 comprises an information ID, bit length and information indicating the necessity of requests. The information ID in the I/O control information list 103 is information indicating "input 1" and "input 2" from the two temperature sensors 81, and "output 1" and "output 2" to the two ventilation devices 82. The bit length is the data length (bit length) of the above-described information ID. The necessity of requests is information indicating whether or not a request is necessary in order to acquire the information ID.

The air conditioning controller 22 is provided with an air conditioning control information memory 22a for storing information output from the custom controller 27, and furthermore executes an air conditioning control program 107 for accomplishing control of the air conditioners 501 and 502.

The lighting controller 24 is provided with a lighting control information memory 24a for storing information output from the custom controller 27, and furthermore executes a lighting control program 108 for accomplishing control of the lighting devices 601 and 602.

The I/O controller 26 is provided with an I/O control information memory 26a for storing information output from the custom controller 27, and furthermore executes an I/O control program 109 for accomplishing communication with equipment connected to the I/O equipments 701 and 702.

The custom controller 27 is provided with a calculation command memory 27a and a custom control information memory 27b. Calculation command functions are stored in the calculation command memory 27a. The calculation command functions stored in the calculation command memory 27a are functions that can be described by logic circuits such as NOT, AND, and/or the like. In addition, information is stored for each bit length in the custom control information memory 27b.

The custom controller 27 executes the custom control program 112 while referencing a custom input/output map 110 and a basic input/output map 111. FIG. 6 schematically shows the custom control program 112. As shown in FIG. 6, the custom control program 112 stores a calculation command ID for specifying the calculations stored in the calculation control memory 27a, information for specifying the arguments "input 1" and "input 2" of the functions used in the calculations specified by the calculation command ID, and information for specifying the "output" of the calculation results.

FIG. 7 is a drawing schematically showing a 1 bit custom input/output map 110 and the custom control information memory 27b. In addition, FIG. 8 is a drawing schematically showing a 16 bit custom input/output map 110 and custom control information memory 27b. As can be seen from FIGS. 7 and 8, the custom input/output map 110 comprises an input/output ID, a process ID, an equipment ID and an information ID. The information is information differing from the information stored in the air conditioning control information memory 22a, the lighting control information memory 24a and the I/O control information memory 26a.

The input/output ID is identifying information for specifying input and output. The process ID is information indicating process contents. The equipment ID is information identifying equipment that is the target of control. The information ID is information relating to the ON/OFF state of the target equipment as described above, and information relating to the "set temperature" and/or the like.

In this preferred embodiment, an equipment ID 1 is assigned to the air conditioner 501 as air conditioning control target equipment and an equipment ID 2 is assigned to the air conditioner 502. In addition, an equipment ID 1 is assigned to the lighting device 601 as light control target equipment and an equipment ID 2 is assigned to the lighting device 602. In addition, an equipment ID 1 is assigned to the I/O equipment 701 as I/O control target equipment and an equipment ID 2 is assigned to the I/O equipment 702.

The above-described custom input/output map 110 is stored in the custom control information memory 27b.

FIG. 9 is a drawing schematically showing the basic input/output map 111. As can be seen by referencing FIG. 9, the basic input/output map 111 comprises an input/output ID, a process ID, an equipment ID and an information ID, the same as the custom input/output map 110. The basic input/output map 111 is stored in the custom control information memory 27b. In this preferred embodiment, the rank sequence of the information of the custom input/output map 110 and the basic input/output map 111 are mutually the same.

The input device 30 is an interface for inputting a control program. A system creator 80 can input to the air conditioner control device 20 the control program shown in FIG. 10, for example, or the input/output definition information shown in FIG. 11, via the input device 30.

The input/output map separator 29 separates the input/output map from the customized control program.

The input/output map converter 28 converts the separated input/output map and creates the custom input/output map 110 and the basic input/output map 111, and furthermore stores the custom input/output map 110 and basic input/output map 111 in the custom control information memory 27b.

Figure 12:
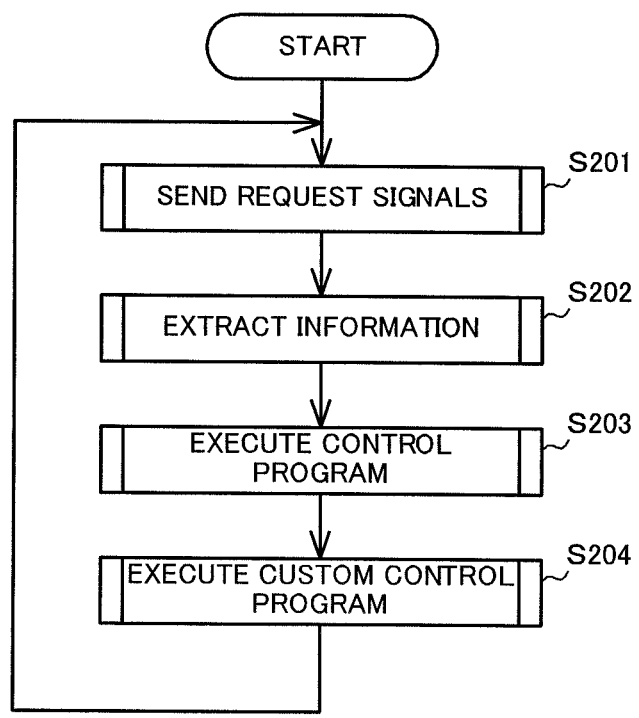
FIG. 12 is a flowchart showing a process executed by an air conditioner control device.

Next, the actions of the air conditioner control device 20 comprised as described above are explained. First, the regular actions (actions of mode 1) of the air conditioner control device 20 when operating the air conditioners 501 and 502 and the lighting devices 601 and 602 are described with reference to FIG. 12. FIG. 12 is a flowchart showing a process executed by the air conditioner control device 20.

Figure 13:
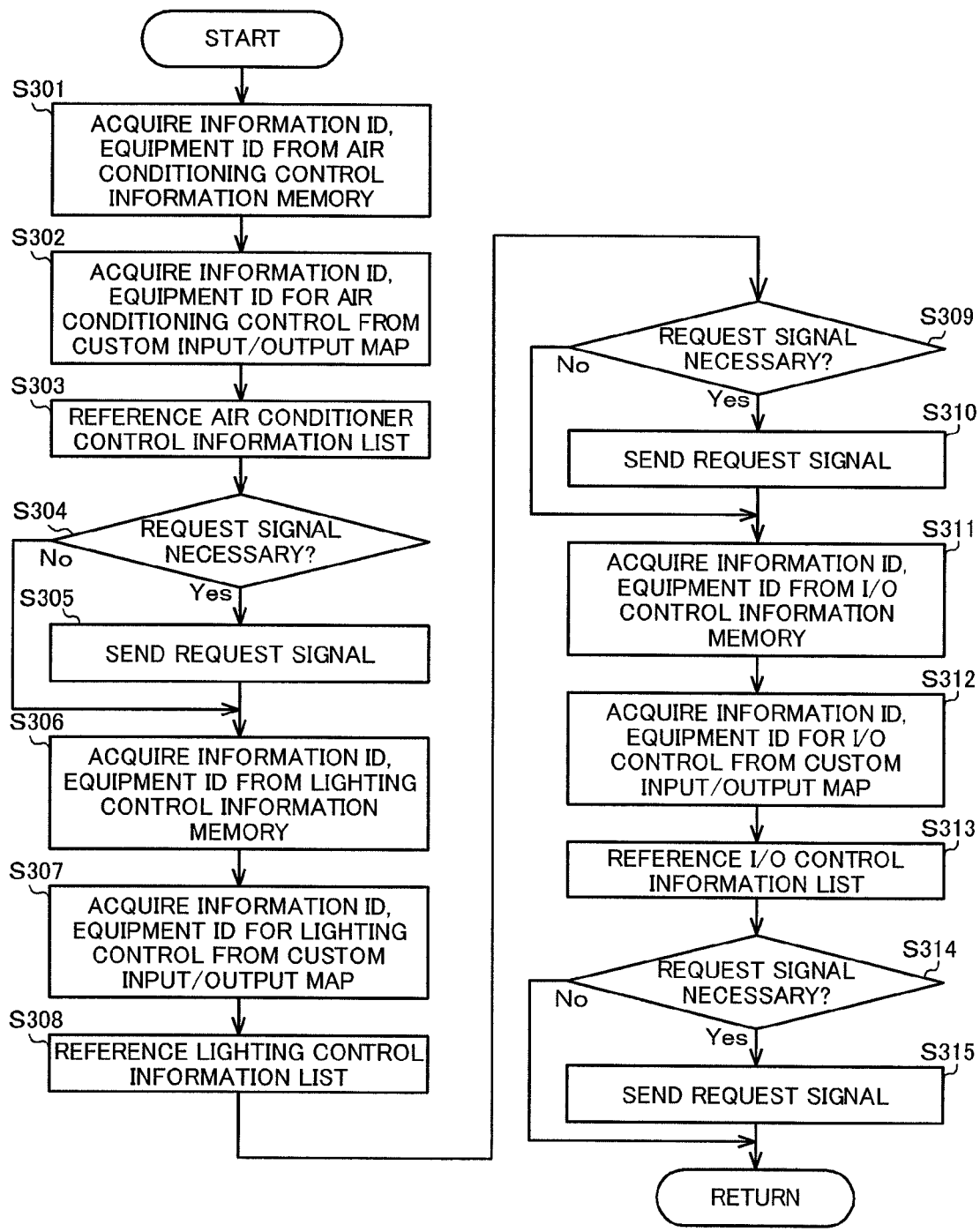
FIG. 13 is a flowchart showing a process executed by an air conditioner control device.

First, in the initial step S201, the air conditioner control device 20 sends a request signal. As shown in FIG. 13, in this process the air conditioner communicator 21 acquires information relating to the information ID and equipment ID stored in the air conditioning control information memory 22a (step S301). For example, the air conditioner communicator 21 acquires the information ID "ON/OFF" and the equipment ID "1" and "2" from the air conditioning control information memory 22a.

Next, the air conditioner communicator 21 acquires information relating to the information ID and the equipment ID whose process ID contents are air conditioning control from the custom input/output map 110 (step S302). As can be seen by referencing FIGS. 7 and 8, for example the air conditioner communicator 21 acquires from the custom input/output map 110 the information ID "operation halt" and "intake temperature" and the equipment ID "1" and "2".

Next, the air conditioner communicator 21 references the acquired information ID and the information ID of the air conditioning control information list 101 (step S303). Furthermore, the air conditioner communicator 21, upon determining as a result of the referencing that a request signal is necessary (step S304: Yes), outputs a request signal to the equipment corresponding to the equipment ID (step S305).

For example, as can be seen by referencing FIG. 3, the request necessity corresponding to the information ID "ON/OFF" and "intake temperature" is "O" mark. In this case, the air conditioner communicator 21 outputs a request signal. On the other hand, the request necessity corresponding to the information ID "operation halt" is "--". In this case, the air conditioner communicator 21 does not output a request signal. Upon determining that request signals are to be sent for any of the information ID, the air conditioner communicator 21 outputs request signals in step S305.

The lighting equipment communicator 23 acquires information relating to the equipment ID and the information ID stored in the lighting control information memory 24a (step S306). For example, the lighting equipment communicator 23 acquires from the lighting control information memory 24a the information ID "ON/OFF" and the equipment ID "1" and "2".

Next, the lighting equipment communicator 23 acquires information relating to the equipment ID and information ID whose process ID contents are lighting control from the custom input/output map 110 (step S307). As can be seen by referencing FIGS. 7 and 8, for example the lighting equipment communicator 23 acquires the information ID "ON/OFF" and the equipment ID "1" and "2" from the custom input/output map 110.

Next, the lighting equipment communicator 23 references the acquired information ID and the information ID of the lighting control information list 102 (step S308). Furthermore, when it is determined that a request signal is necessary as a result of this referencing (step S309: Yes), the lighting equipment communicator 23 outputs a request signal to the equipment corresponding to the equipment ID (step S310).

For example, as can be seen by referencing FIG. 4, the request necessity corresponding to the information ID "ON/OFF" and "brightness" is "O" mark. In this case, the lighting equipment communicator 23 outputs a request signal.

The I/O equipment communicator 25 acquires information relating to the equipment ID and the information ID stored in the I/O control information memory 26a (step S311). For example, the I/O equipment communicator acquires the information ID "input 1" and "output 2" and the equipment ID "1" and "2" from the I/O control information memory 26a.

Next, the I/O equipment communicator 25 acquires information relating to the equipment ID and the information ID whose process ID contents are I/O control from the custom input/output map 110 (step S312). As can be seen by referencing FIGS. 7 and 8, for example the I/O equipment communicator 25 acquires the information ID "input 1" and "output 2" and the equipment ID "1" and "2" from the custom input/output map 110.

Next, the I/O equipment communicator 25 references the acquired information ID and the information ID of the I/O control information list 103 (step S313). Furthermore, when it is determined that a request signal is necessary as a result of this referencing (step S314: Yes), the I/O equipment communicator 25 outputs a request signal to the equipment corresponding to the equipment ID (step S315).

For example, as can be seen by referencing FIG. 5, the request necessity corresponding to the equipment ID "input 1" is "O". In this case, the lighting equipment communicator 23 outputs a request signal. On the other hand, the request necessity corresponding to the information ID "output 2" is "--". In this case, the I/O equipment communicator 25 does not output a request signal. The I/O equipment communicator 25 outputs a request signal in step S315 when it is determined that a request signal is to be sent for any of the information ID.

Figure 14:
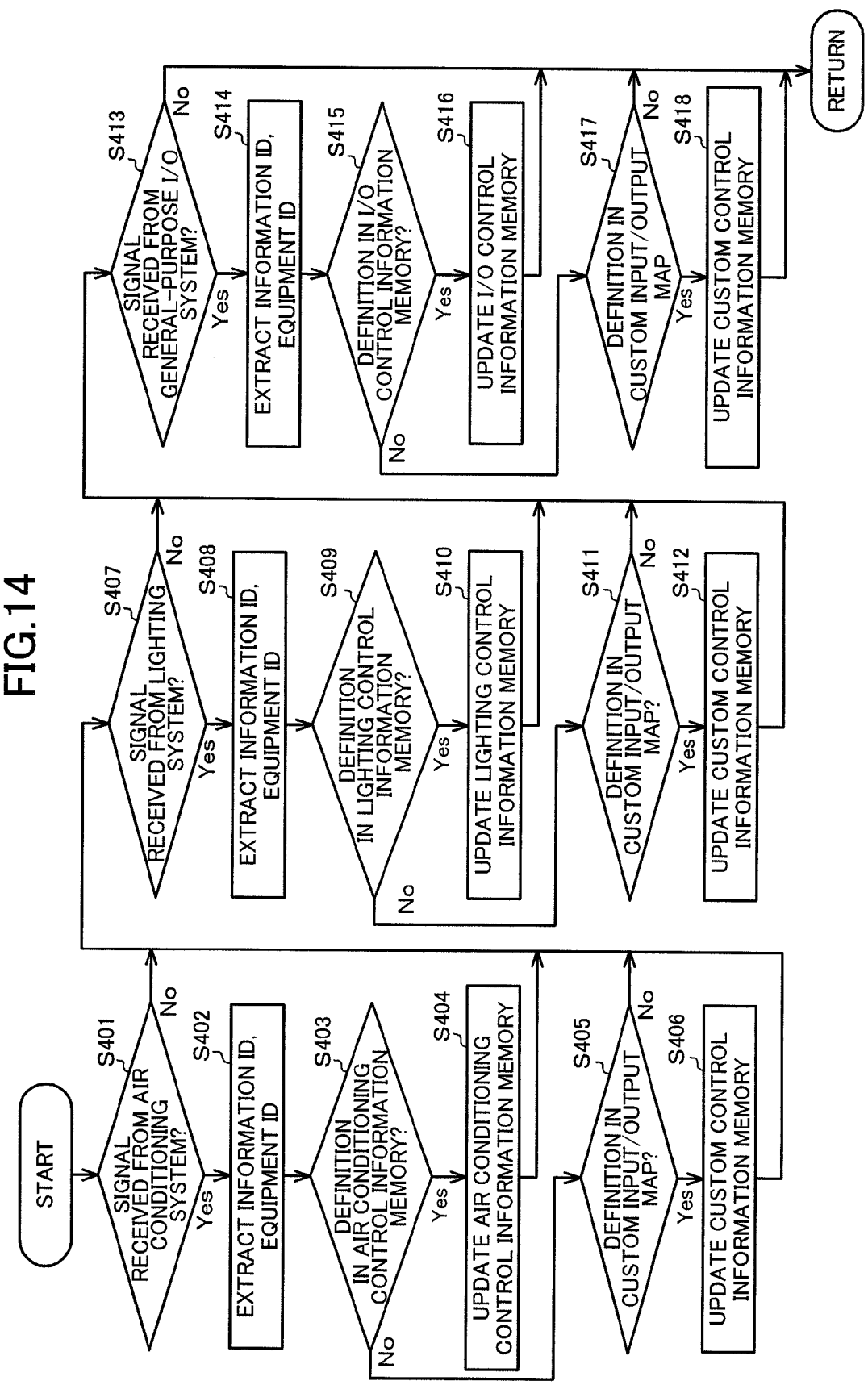
FIG. 14 is a flowchart showing a process executed by an air conditioner control device.

When the process from steps S301 through S315 concludes, the air conditioner control device 20 accomplishes the information extraction process of step S202 in FIG. 12. As shown in FIG. 14, in this process the air conditioner communicator 21 waits for a control signal sent from the air conditioning system 50 (step S401). Upon receiving the control signal from the air conditioning system 50 (step S401: Yes), the air conditioner communicator 21 analyzes the control signal received and extracts the information ID and equipment ID and values relating to the information ID (step S402).

Next, the air conditioner communicator 21 determines whether or not the extracted information ID and equipment ID are defined in the air conditioning control information memory 22a (step S403). When the extracted information ID and equipment ID are defined in the air conditioning control information memory 22a (step S403: Yes), information relating to the extracted information ID and equipment ID overwrites the corresponding location in the air conditioning control information memory 22a so that the air conditioning control information memory 22a is updated (step S404).

On the other hand, when the extracted information ID and equipment ID are not defined in the air conditioning control equipment memory 22a (step S403: No), a determination is made as to whether or not the extracted information ID and equipment ID are defined in the custom input/output map 110 (step S405). When the extracted information ID and equipment ID are defined in the custom input/output map 110 (step S405: Yes), information relating to the extracted information ID and equipment ID overwrites the corresponding location in the custom control information memory 27b, so that the custom control information memory 27b is updated (step S406).

The lighting equipment communicator 23 waits for a control signal output from the lighting system 60 (step S407). Upon receiving a control signal from the lighting system 60 (step S407: Yes), the lighting equipment communicator 23 analyzes the control signal received and extracts the information ID and equipment ID and values relating to the information ID (step S408).

For example, when the lighting device 601 that was flashing is put out, the value of the information ID "ON/OFF" corresponding to the equipment ID "1" becomes 0. In this case, the equipment ID "1" and the information ID "ON/OFF", and the value 0 of the information ID "ON/OFF" are extracted.

Next, the lighting equipment communicator 23 determines whether or not the extracted information ID and equipment ID are defined in the lighting control information memory 24a (step S409). When the extracted information ID and equipment ID are defined in the lighting control information memory 24a (step S409: Yes), the information relating to the extracted information ID and equipment ID at the corresponding location in the lighting control information memory 24a is overwritten so that the lighting control information memory 24a is updated (step S410).

On the other hand, when the extracted information ID and equipment ID are not defined in the lighting control information memory 24a (step S409: No), a determination is made as to whether or not the extracted information ID and equipment ID are defined in the custom input/output map 110 (step 411). When the extracted information ID and equipment ID are defined in the custom input/output map 110 (step S411: Yes), the information relating to the extracted information ID and equipment ID at the corresponding location in the custom control information memory 27b is overwritten so that the custom control information memory 27b is updated (step S412).

For example, the extracted equipment ID "1" and information ID "ON/OFF" and the value "0" of the information ID "ON/OFF" are not defined in the lighting control information memory 24a but, as can be seen by referencing FIG. 7, are defined related to the input/output map ID "D0" in the custom input/output map 110. In this case, the value "1" corresponding to the input/output map ID "D0" of the corresponding custom control information memory 27b is updated to "0".

The I/O equipment communicator 25 waits for a control signal to be sent from the general-purpose I/O system 70 (step S413). Upon receiving a control signal from the general-purpose I/O system 70 (step S413: Yes), the I/O equipment communicator 25 analyzes the control signal received and extracts the information ID and equipment ID and values relating to the information ID (step S414).

Next, the I/O equipment communicator 25 determines whether or not the extracted information ID and equipment ID are defined in the I/O control information memory 26a (step S415). When the extracted information ID and equipment ID are defined in the I/O control information memory 26a (step S415: Yes), the information relating to the extracted information ID and equipment ID in the corresponding location of the I/O control information memory 26a is overwritten so that the I/O control information memory 26a is updated (step S416).

On the other hand, when the extracted information ID and equipment ID are not defined in the I/O control information memory 26a (step S415: No), a determination is made as to whether or not the extracted information ID and equipment ID are defined in the custom input/output map 110 (step S417). When the extracted information ID and equipment ID are defined in the custom input/output map 110 (step S417: Yes), the information relating to the extracted information ID and equipment ID at the corresponding location of the custom control information memory 27b is overwritten so that the custom control information memory 27b is updated (step S418).

Figure 15:
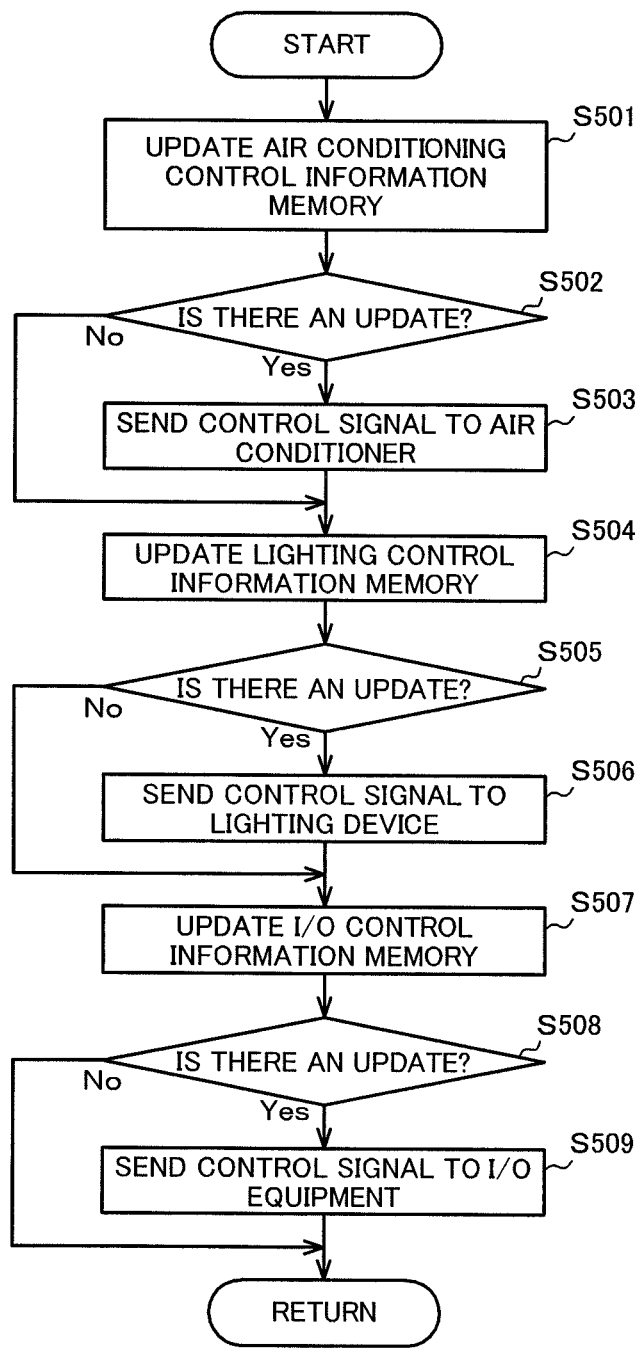
FIG. 15 is a flowchart showing a process executed by an air conditioner control device.

When the process from step S401 through S418 concludes, the air conditioner control device 20 accomplishes the process of executing the control program in step S203 in FIG. 12. As shown in FIG. 15, in this process the air conditioning controller 22 executes the air conditioning control program 107 and updates the air conditioning control information memory 22a (step S501) and, when the air conditioning control information memory 22a has been updated (step S502: Yes), communicates the updated contents to the air conditioning system 50 via the air conditioner communicator 21 (step S503).

The lighting controller 24 executes the lighting control program 108 and updates the lighting control information memory 24a (step S504) and, when the lighting control information memory 24a has been updated (step S505: Yes), communicates the updated contents to the lighting system 60 via the lighting equipment communicator 23 (step S506).

The I/O controller 26 executes the I/O control program 109 and updates the I/O control information memory 26a (step S507) and, when the I/O control information memory 26a has been updated (step S508: Yes), communicates the updated contents to the general-purpose I/O system 70 via the I/O equipment communicator 25 (step S509).

Figure 16:
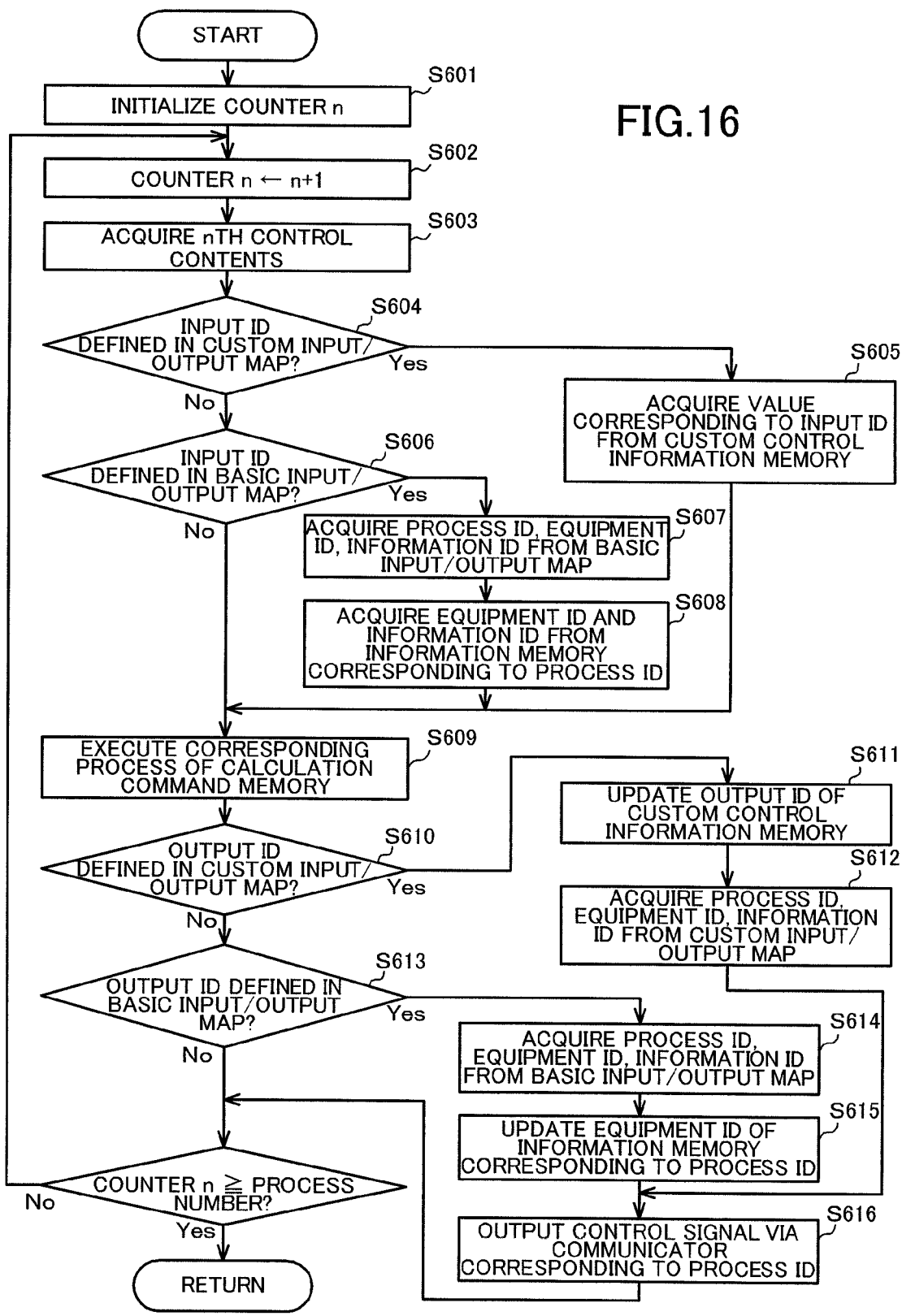
FIG. 16 is a flowchart showing a process executed by an air conditioner control device.

When the processes from step S501 through S509 conclude, the air conditioner control device 20 accomplishes the process of executing the custom control program of step S204 in FIG. 12. As shown in FIG. 16, in this process the custom controller 27 first initializes a counter n (step S601) and then increments the counter n (step S602).

Next, the custom controller 27 acquires the nth control content stipulated by the custom control program 112 (step S603). For example, when the value of the counter n is 1, the first control contents are acquired. As can be seen by referring to FIG. 6, when the value of the counter n is 1, the value corresponding to the input 1 "D0" is reversed and the control contents output to the output "B0" are acquired. When the input is 0, the calculation command ID "=0 (reverse)" outputs 0.

When the input ID is defined in the custom input/output map 110 (step S604: Yes), the custom controller 27 acquires a value corresponding to the input ID from the custom control information memory 27b (step S605). For example, because the input 1 "D0" acquired in step S603 matches the input/output ID expressing the first input/output of the 1 bit custom input/output map 110, the first value of the custom control information memory 27b is acquired. Because this value was updated to "0" in step S412, here the value "0" is acquired.

On the other hand, when the input ID is not defined in the basic input/output map 111 (step S604: No; step S606: Yes), the custom controller 27 acquires the process ID, the equipment ID and the information ID from the basic input/output map 111 (step S607), and then acquires as input values the equipment ID and information ID and values corresponding to these from the air conditioning control information memory 22a of the air conditioning controller 22, the lighting control information memory 24a of the lighting controller 24 or the I/O control information memory 26a of the I/O control 26 in accordance with the process ID acquired (step S608).

For example, when the contents of the process ID are air conditioning control, the custom controller 27 acquires as input values the equipment ID and information ID and values corresponding to these from the air conditioning control information memory 22a via the air conditioning controller 22.

Next, the custom controller 27 calls a calculation command defined in the control contents acquired in step S603 from the calculation command memory 27a, and then executes the called calculation command using as arguments the input values acquired in step S605 or step S608 (step S609). Through this, the output values for the above-described input values are calculated.

For example, the custom controller 27 accomplishes the calculation indicated by "=0 (reversal)" using the input value "0" as an argument. Through this, the output value "0" is calculated.

When the output ID is defined in the custom input/output map 110 (step S610: Yes), the custom controller 27 updates the value of the output ID of the custom control information memory to the output value calculated in step S609 (step S611), and then acquires the process ID, equipment ID and information ID from the custom input/output map 110 (step S612).

On the other hand, when the output ID is defined in the basic input/output map 111 (step S610: No; step S613: Yes), the custom controller 27 acquires the process ID, equipment ID and information ID from the basic input/output map 111 (step S614).

For example, the output "B0" acquired in step S603 is defined in the basic input/output map 111, so here the process ID "air conditioning control", the equipment ID "1" and the information ID "ON/OFF" are acquired from the basic input/output map 111.

Next, the custom controller 27 updates the values of the equipment ID and the information ID of the air conditioning control information memory 22a of the air conditioning controller 22, the lighting control information memory 24a of the lighting controller 24 or the I/O control information memory 26a of the I/O controller 26 to the calculated output values in accordance with the process ID acquired.

Here, because the contents of the process ID are "air conditioning control", the value "1" of the equipment ID corresponding to the information ID "ON/OFF" of the air conditioning control information memory 22a is updated to the value "0" calculated in step S609.

Next, the custom controller 27 outputs a control signal comprising the updated values of the information ID to the device specified by the equipment ID via any of the air conditioner communicator 21, the lighting equipment communicator 23 or the I/O equipment communicator 25 in accordance with the corresponding process ID, for the process ID, equipment ID and information ID acquired in step S612 or step S614 (step S616).

For example, when the contents of the process ID are "air conditioning control," a control signal comprising the updated value "0" and information ID "ON/OFF" is output to the air conditioner 501 corresponding to the equipment ID "1" via the air conditioner communicator 21. As a result, the air conditioner 501 changes to an OFF state (a state with operation halted).

The custom controller 27 determines whether or not the value of the counter n is larger than the number of processes (process number) stipulated by the custom control program 112 (step S617), and when the value of the counter n is smaller than the process number (step S617: No), the above-described series of processes is repeated. Furthermore, when the value of the counter n is at least as great as the process number (step S617: Yes), the custom controller 27 concludes the process.

In this manner, by the air conditioner control device 20 repeating the processes from steps S201 through S204 of FIG. 12, the air conditioners 501 and 502 are operated.

Figure 17:
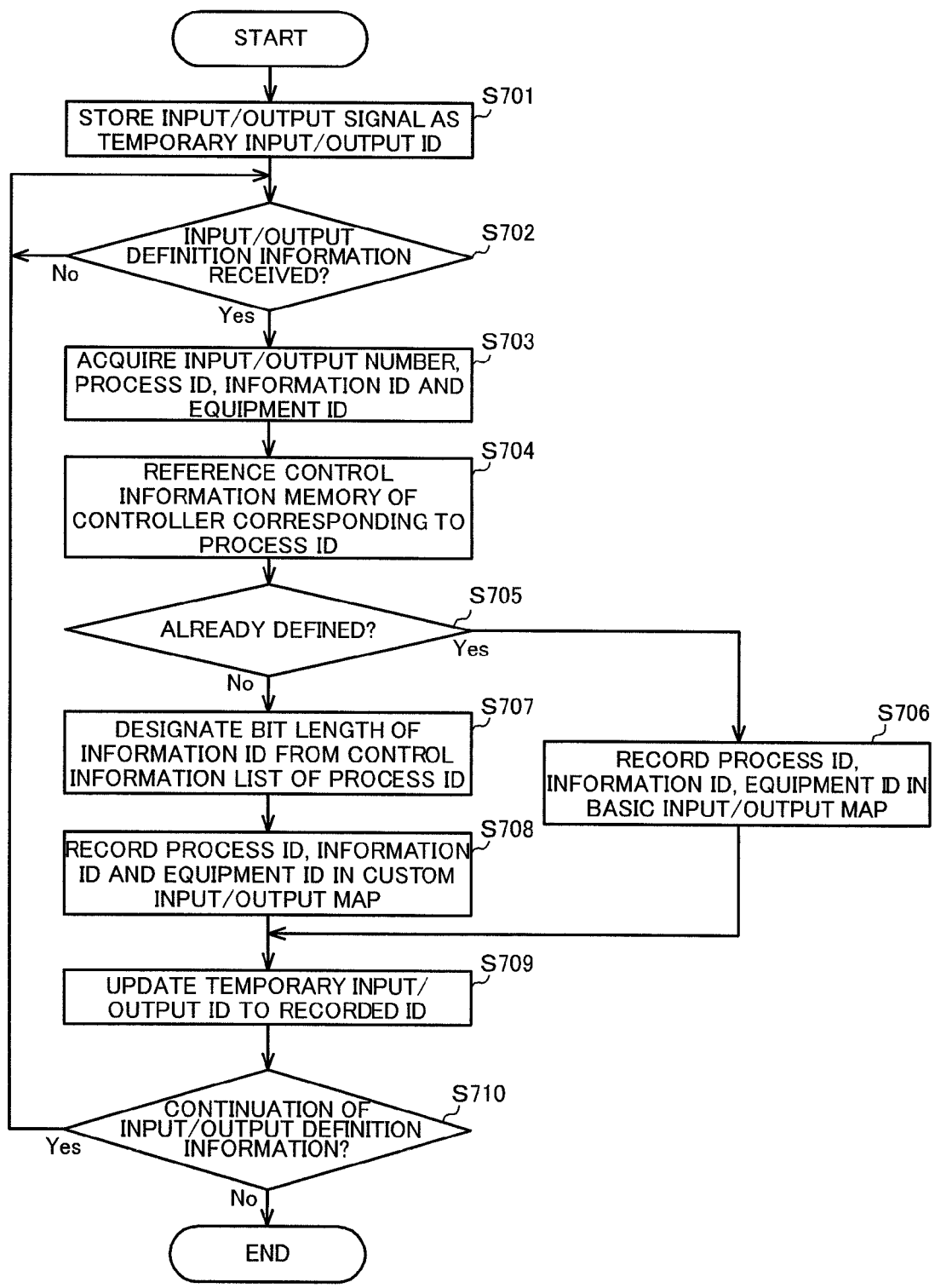
FIG. 17 is a flowchart showing a process executed by an air conditioner control device.

Next, the action of the air conditioner control device 20 when installing a new control program (action of mode 2) will be described with reference to FIG. 17. FIG. 17 is a flowchart showing the processes executed by the air conditioner control device 20 when a control program is installed.

When a control program is input into the input device 30 by the system creator 80, the custom controller 27 assigns a temporary ID to the input ID and to the output ID as shown in FIG. 10, and stores the input control program as a custom control program 112 (step S701).

Next, the custom controller 27 waits for input/output definition information input by the system creator 80 (step S702). When the input/output definition information is input (step S702: Yes), first the process ID, equipment ID and information ID of the row of the input/output number 1 are acquired (step S703)

Next, the custom controller 27 references the air conditioning control information memory 22a of the air conditioning controller 22, the lighting control information memory 24a of the lighting controller 24 or the I/O control information memory 26a of the I/O controller 26 in accordance with the process ID (step S704). For example, when the process ID is "lighting control", the lighting control information memory 24a of the lighting controller 24 is referenced.

Next, when the combination of the process ID and equipment ID acquired is defined in the various control information memories 22a, 24a and 26a (step S705: Yes), the custom controller 27 records a new process ID, equipment ID and information ID by updating the process ID, equipment ID and information ID of the basic input/output map 111 to the process ID, equipment ID and information ID acquired in step S703 (step S706).

On the other hand, when the combination of the process ID and equipment ID is not defined in the various control information memories 22a, 24a and 26a (step S705: No), the custom controller 27 specifies the bit length of the information ID based on the air conditioning information list 101, the lighting control information list 102 or the I/O control information list 103 in accordance with the process ID (step S707).

Then, a new process ID, equipment ID and information ID are recorded by updating the process ID, equipment ID and information ID of the custom input/output map 110 corresponding to the specified bit length to the process ID, equipment ID and information ID acquired in step S703 (step S708).

For example, when the bit length is 1, the process ID "lighting control", the information ID "ON/OFF" and the equipment ID "1" corresponding to 1 bit are updated. In addition, when the bit length is 16 bits, similarly the custom input/output map 110 corresponding to 16 bits is updated.

Next, the custom controller 27 records the input/output ID of the basic input/output map 111 or the custom input/output map 110 in the input/output ID of the custom control program to which the temporary input ID and output ID of the input/output definition information are assigned (step S709).

For example, the initial input/output ID of the custom input/output map 110 is "D0". Consequently, the temporary input ID "1" of the input A of the custom control program shown in FIG. 10 is updated and "D0" is set at the corresponding location.

In the air conditioner control device 20, when there is continuation of the input/output definition information (step S710: Yes), the processes from steps S702 through S710 are repeated. Furthermore, when there is no continuation of the input/output definition information (step S710: No), the process for the installation is completed.

Next, the actions of the air conditioner control device 20 are described by citing a concrete example. For convenience in explanation, let us assume that the lighting controller 24 and the I/O controller 26 do not accomplish automatic control. In this case, nothing is stored in the lighting control information memory 24a or the I/O control information memory 26a.

Here, control such that when a lighting equipment turns OFF the neighboring air conditioner turns off is deemed energy-saving control 1, and control such that when the temperature of air taken in by an air conditioner is lower than the outside air temperature the air conditioner turns off and the neighboring ventilation device turns on is deemed energy-saving control 2. Below, the explanation is for an example in which the system creator 80 adds to the existing control program a program for executing the energy-saving control 1 and the energy-saving control 2.

The system creator 80 inputs the control program shown in FIG. 10 and the input/output definition information shown in FIG. 11 into the input device 30. The system creator 80 acquires the equipment ID and information list of each device from design materials and creates the control program and the input/output definition information. The information list is equivalent to the air conditioning control information list 101, the lighting control information list 102 and the I/O control information list 103 stored in the air conditioner control device 20.

When the system creator 80 inputs the control program and the input/output definition information into the input device 30, the mode 2 action is executed.

The custom controller 27 assigns temporary IDs to the input ID and the output ID as shown in FIG. 10, and stores the input control program as a custom control program 112 (step S701).

Next, when the input/output definition information is input (step S702: Yes), the custom controller 27 first acquires the process ID, equipment ID and information ID of the row of the input/output number 1 (step S703).

Because the process ID of the row of the input/output number "1" is "lighting control", the custom controller 27 references the lighting control information memory 24*a* (step S704) and determines whether or not the information ID "ON/OFF" is defined (step S705).

In this concrete example, this information ID is not defined in the lighting control information memory 24*a* (step S705: No), so the custom controller 27 references the lighting control information list 102 and specifies the bit length of the information ID "ON/OFF" (step S707). Because the bit length of the information ID "ON/OFF" is "1", the custom controller 27 updates the information corresponding to the input/output number "1" with the bit length of "1" in the custom input/output map 110, and then records the process ID "lighting control", information ID "ON/OFF" and the equipment ID "1" of the first row of the custom input/output map 110 (step S708).

Next, the custom controller 27 sets the input/output ID "D0" of the custom input/output map 110 to the input/output ID of the custom control program to which the output ID and the temporary ID of the input/output definition information are set (step S709). The input/output ID of the custom input/output map 110 is "D0" in the first of the 1 bit. Consequently, "D0" is set in the input/output ID of the custom control program 112 of FIG. 10 to which "1" is assigned by the temporary input/output ID. Through this, the input A of the first process of the custom control program 112 is set to "D0".

At the point in time when the process ends for the first row of the input/output definition information, the process of the second and subsequent remain (step S710: Yes). Accordingly, the custom controller 27 accomplishes the process for the second row of the input/output definition information.

The custom controller 27 acquires the process ID, equipment ID and information ID of the row of input/output number 2 (step S703).

The process ID of the row of the input/output number "2" is "air conditioning control", so the custom controller 27 references the air conditioning control information memory 22*a* (step S704) and determines whether or not the information ID "ON/OFF" is defined (step S705).

In this concrete example, the information ID is defined in the air conditioning control information memory 22*a* (step S705: Yes), so the custom controller 27 records the process ID "air conditioning control", the information ID "ON/OFF" and the equipment ID "1" in the basic input/output map 111.

In addition, the input/output ID of the basic input/output map 111 is the "B0" of the first row. Consequently, the custom controller 27 sets "B0" in the input/output ID of the custom control program 112 to which "2" was assigned by the temporary input/output ID. Through this, the output of the first process of the custom control program 112 and the output of the third process are set to "B0".

Following this, the above-described process is executed for the remaining rows of the input/output definition information. When the process is concluded for all of the input/output definition information, the custom control program 112 is in the state shown in FIG. 6. In addition, the custom input/output map 110 is in the state shown in FIGS. 7 and 8. In addition, the basic input/output map 111 is in the state shown in FIG. 9.

Next, an example of when the energy-saving control 1 and energy-saving control 2 are executed for the actions of mode 1 is explained. First, when the energy-saving control 1 is executed, the air conditioner communicator 21 acquires an information ID and a equipment ID stored in the air conditioning control information memory 22*a* (step S301), and next the air conditioner communicator 21 acquires an information ID and an equipment ID their process ID means air conditioning control from the custom input/output map 110 (step S302).

In this concrete example, the equipment ID "1" and "2" of the information ID "ON/OFF" are acquired from the air conditioning control information memory 22*a*, and the equipment ID "1" and "2" of the information ID "operation halt" and the equipment ID "1" and "2" of the information ID "intake temperature" are acquired from the custom input/output map 110.

Next, the air conditioner communicator 21 references the air conditioning control information list 101 (step S303). Here, the information ID "ON/OFF" and "intake temperature" are defined as a request signal being necessary (step S304: Yes), so a request signal is set to the equipment corresponding to the equipment ID "1" and "2" (step S305). The information ID "operation halt" is defined as a request signal being unnecessary. In this case, the process of sending a request signal is not accomplished. In addition, the information ID "set temperature" not being utilized by either the air conditioning controller 22 or the custom controller 27 is defined as a request being necessary, but a request signal is not sent.

The lighting equipment communicator 23 acquires the information ID and equipment ID stored in the lighting control information memory 24*a* (step S306) and then acquires the information ID and equipment ID whose process ID is lighting control from the custom input/output map 110 (step S307).

In this concrete example, the equipment ID "1" and "2" of the information ID "ON/OFF" is acquired from the custom input/output map 110.

Next, the lighting equipment communicator 23 references the lighting control information list 102 (step S308). Here, the information ID "ON/OFF" is defined as a request signal being necessary (step S309: Yes), so a request signal is sent to the equipment corresponding to the equipment ID "1" and "2" (step S310).

The I/O equipment communicator 25 acquires the information ID and equipment ID stored in the I/O control information memory 26*a* (step S311) and then acquires the information ID and the equipment ID whose process ID is "I/O control" from the custom input/output map 110 (step S312).

In this concrete example, the equipment ID "1" and "2" of the information ID "input 1" and the equipment ID "1" and "2" of the information ID "output 2" are acquired from the custom input/output map 110.

Next, the I/O equipment communicator 25 references the I/O control information list 103 (step S313). Here, the information ID "input 1" is defined as a request signal being necessary (step S314: Yes), so a request signal is sent to the equipment corresponding to the equipment ID "1" and "2" (step S315). The information ID "output 2" is defined as a request signal not being necessary, so a request signal is not sent.

Next, the process in mode 1 when the lighting equipment 601 is OFF for the energy-saving control 1 is described in detail.

The air conditioner communicator 21 receives control signals from the air conditioners 501 and 502 via a network (step S401). Here, explanation is omitted because there are no changes in values.

The lighting equipment communicator 23 receives control signals from the lighting devices 601 and 602 via a network (step S407). Here, the fact that the value of the information ID "ON/OFF" of the equipment ID "1" is "0" is extracted (step S408).

The equipment ID "1" of the information ID "ON/OFF" is not defined in the lighting control information memory 24a or the custom input/output map 110 (step S409: No), so the process proceeds to the next step S411.

Because the process ID "lighting control", the information ID "ON/OFF" and the equipment ID "1" are defined in the input/output ID "D0" of the custom input/output map 110 (step S411: Yes), the lighting equipment communicator 23 stores "0" in the first of the 1 bit of the corresponding custom control information memory 27b (step S412).

The I/O equipment communicator 25 receives control signals from the I/O equipments 701 and 702 via a network (step S413). Here, there is no change in values so explanation is omitted.

The process shown in FIG. 15 is unrelated to the energy-saving control 1, so explanation is omitted.

The custom controller 27 acquires the first control contents of the custom control programs 112 (step S603). Here, contents to the effect that a calculation "=0 (reversal)" is implemented in "D0" and output to "B0" are acquired. The "=0 (reversal)" is the ID of the calculation command "output 0 to output when the input is 0."

The "D0" defined in the input is an input ID indicating the first of the 1 bit custom input/output maps 110 (step S604: Yes), so the first of the 1 bit part of the custom control information memory 27b is acquired as the input value (step S605). Here, "0" is stored so the input value is "0".

The custom controller 27 calls and executes the calculation command "=0 (reversal)" with "0" as the input value, and acquires the output value "0" as the calculation results thereof (step S609).

Because the "B0" defined in the output is the ID defined in the basic input/output map 111 (step S610: Yes), the custom controller 27 acquires the process ID "air conditioning control", the equipment ID "1" and the information ID "ON/OFF" from the basic input/output map 111 (step S612). In addition, the equipment ID "1" of the information ID "ON/OFF" of the air conditioning control information memory 22a is updated to the output value "0" via the air conditioning controller 22 corresponding to the process ID "air conditioning control" (step S611).

The custom controller 27 sends a control signal comprising the updated value "0" and the information ID "ON/OFF" to the air conditioner 501 corresponding to the equipment ID "1" via the air conditioner communicator 21 corresponding to the process ID "air conditioning control". As a result, the air conditioner 501 turns off.

Here, there is continuation of the custom control program 112 (step S617: No), so the counter n is incremented (step S602) and then the process returns to step S603. Explanation from here on is omitted because there are no control contents having a change in input.

Next, the process of mode 1 executed when the outside temperature is low due to sunset and/or the like in a state where the air conditioner 501 is turned on (is operating) is explained for the energy-saving control 2.

The air conditioner communicator 21 receives control signals from the air conditioners 501 and 502 via a network (step S401). Here, there is no change in values so explanation is omitted.

The lighting equipment communicator 23 receives control signals from the lighting devices 601 and 602 via a network (step S407). Here, there is no change in values so explanation is omitted.

The I/O equipment communicator 25 receives control signals from the I/O equipment 701 and 702 comprising the general-purpose I/O system 70 via a network (step S413). Here, the values of the information ID "input 1" of the equipment ID "1" and "2" have become "27" are respectively extracted (step S414).

Because the equipment ID "1" and "2" of the information ID "input 1" are not defined in the I/O control information memory 26a, the I/O equipment communicator 25 proceeds to step S417.

Because the process ID "I/O control", the information ID "input 1" and the equipment ID "1" are defined in the input/output ID "A0" of the custom input/output map 110 (step S417), the I/O equipment communicator 25 stores "27" in the first of the 16 bit part of the corresponding custom control information memory 27b (step S418).

Similarly, because the process ID "I/O control", the information ID "input 1" and the equipment ID "2" are defined in the input/output ID "A1" of the custom input/output map 110 (step S417: Yes), "27" is stored in the second of the 16 bit parts of the corresponding custom control information memory 27b (step S418).

The process shown in FIG. 15 is unrelated to the energy-saving control 2, so explanation is omitted.

The custom controller 27 acquires the first control contents of the custom control program 112 (step S603). Here, there is no change in values in the input of the first and second control contents, so explanation is omitted and the third control contents are explained.

In this case, a calculation "<(reversal)" is implemented on "A0" and "A2" and the contents to output "B0" are acquired (step S603). The "<(reversal)" is the ID of the calculation command "compare the inputs 1 and 2 and output 0 to the output when input 1 is smaller".

Because the "A0" defined in input 1 is an input/output ID expressing the first of the 16 bit custom input/output map 110 (step S604: Yes), the custom controller 27 acquires the first "27" of the 16 bit part of the custom control information memory 27b as the input value 1 (step S605).

Because the "A2" defined in input 2 is an input/output ID expressing the third of the 16 bit custom input/output map 110 (step S604: Yes), the custom controller 27 acquires the third "30" of the 16 bit part of the custom control information memory 27b as the input value 2 (step S605).

The custom controller 27 calls and executes the calculation command "<(reversal)" with "27" as the input value 1 and "30" as the input value 2, and acquires the output value "0" as the calculation results thereof (step S609).

Because the "B0" defined in the output is an ID defined in the basic input/output map 111 (step S610: Yes), the custom controller 27 acquires the process ID "air conditioning control", the equipment ID "1" and the information ID "ON/OFF" from the basic input/output map 111 (step S612). In addition, the equipment ID "1" of the information ID "ON/OFF" of the air conditioning control information memory 22a is updated to the output value "0" via the air conditioning controller 22 corresponding to the process ID "air conditioning control" (step S611).

The custom controller 27 sends to the air conditioner 501 corresponding to the equipment ID "1" a control signal comprising the updated value "0" and the information ID "ON/OFF" via the air conditioner communicator 21 corresponding to the process ID "air conditioning control". As a result, the air conditioner 501 turns off.

Because there is continuation of the custom control program 112 (step S617: No), the counter n is incremented by 1 (step S602) and the process then returns to step S603.

The custom controller 27 acquires the fourth control contents of the custom control program 112 (step S603). Here, the contents to perform the calculation "<" on "A0" and "A2" and output to "D4" is acquired. This "<" is the ID of the calculation command "compare inputs 1 and 2 and output 1 to output when input 1 is smaller".

Similar to the third control contents, the input values 1 and 2 are "27" and "30". The custom controller 27 calls and executes the calculation command "<" with "27" as the input value 1 and "30" as the input value 2, and acquires the output value "1" as the calculation results thereof (step S609).

Because the "D4" defined in the output is the fifth ID of the 1 bit part of the custom input/output map 110 (step S610: Yes), the custom controller updates the fifth of the 1 bit part of the custom control information memory 27b to the output value "1" (step S611) and acquires the fifth process ID "I/O control", equipment ID "1" and information ID "output 2" of the 1 bit part of the custom input/output map 110 (step S612).

The custom controller 27 sends to the I/O equipment 701 corresponding to the equipment ID "1" a control signal comprising the updated value "1" and the information ID "output 2" via the I/O equipment communicator 25 corresponding to the process ID "I/O control". As a result, the ventilation device connected to the output 2 of the I/O equipment 701 turns on.

Here, there is a continuation of the custom control program 112 (step S617: No), so the counter n is incremented (step S602) and the process returns to step S603.

The custom controller 27 acquires the fifth control contents of the custom control program 112 (step S603). Here, the contents to implement the calculation "<" on "A0" and "A2" and output to "D2" are acquired. Because up until acquisition of the output value is the same as in the fourth control contents, explanation is omitted.

Because the "D2" defined in the output is the third ID of the 1 bit part of the custom input/output map 110 (step S610: Yes), the custom controller updates the third of the 1 bit parts of the custom control information memory 27b to the output value "1" (step S611) and acquires the third process ID "air conditioning control", equipment ID "1" and information ID "operation halt" of the 1 bit part of the custom input/output map 110 (step S612).

The custom controller 27 outputs to the air conditioner 501 corresponding to the equipment ID "1" a control signal comprising the updated value "1" and the information ID "operation halt" via the air conditioner communicator 21 corresponding to the process ID "air conditioning control" (step S616). As a result, operations from the remote control, namely ON/OFF of the air conditioner 501 and operation mode changes, are halted.

Because there is a continuation of the custom control program 112 (step S617: No), the counter n is incremented by 1 (step S602) and the process then returns to step S603. From here, processes similar to the above-described processes are successively executed.

As explained above, with this preferred embodiment it is possible to realize air conditioner control corresponding to circumstances with a small-volume memory source by efficiently storing only information necessary for the desired control from among information that can be acquired from air conditioning devices, lighting devices and/or the like. Accordingly, it is possible to efficiently accomplish customization of a control program installed in a control device having relatively small memory capacity.

Information acquired from air conditioning devices, lighting devices and I/O equipment is centrally managed by the custom controller 27. Consequently, when there is bias in the utilized number of inputs/outputs for each system according to customer requests, efficient use of memory resources is possible.

For example, when comprising a custom control program targeting two systems, when for customer A 4 bytes of input/output is utilized from system A and 2 bytes from system B and for customer B 2 bytes of input/output is utilized from system A and 4 bytes from system B, when different memory is secured for each system, a total of 8 bytes (4 bytes×2 devices) is necessary. In contrast, with this device it is possible to curtail this to 6 bytes.

In this preferred embodiment, information acquired from the air conditioning devices, lighting devices and I/O equipment is stored after being compiled by necessary bit length for the expression of the information regardless of the type of system from which acquired. Consequently, in storing expressible information with less than the minimum unit of memory reservation, efficient use of memory resources is possible.

For example, when the unit for reserving memory is 1 byte units for 1 bit contact information such as the ON/OFF value frequently used in equipment systems, when storing the contact information one at a time for the two systems, 2 bytes of memory capacity is necessary. With the present device, the information is stored in a state with the bit length arranged by criterion in a region reserving each piece of information. Consequently, 1 byte information such as the ON/OFF value of multiple systems and/or the like can be reserved by 1 byte of memory.

In this preferred embodiment, in conjunction with a process for storing information in the custom control information memory 27b by compiling by bit length, the custom input/output map 110 is automatically sorted. Consequently, when the custom control program is executed, it is possible to access the memory on the premise that the custom input/output map 110 and the custom control information memory 27b are in a coordinated order. Consequently, it is possible to delete regions where information specifying access source is stored.

In this preferred embodiment, out of the inputs/outputs of the custom control program 112, the inputs/outputs specially defined in advance and used in controlling the air conditioning devices, lighting devices and I/O equipment are specially assigned to the basic input/output map 111. Consequently, overlap between the basic input/output map 111 and the custom control information memory 27b with the same information recorded does not occur. Through this, efficient use of memory resources is possible.

In this preferred embodiment, input/output is automatically divided between the custom input/output map 110 and the basic input/output map 111. Consequently, the system creator can input input/output definition information without being aware of which each input/output is defined in. Accordingly, the work load on the system creator can be reduced. In addition, inefficient use of memory resources caused by setting errors can be prevented.

In this preferred embodiment, the air conditioner communicator 21, the lighting equipment communicator 23 and the I/O equipment communicator 25 send request signals to each equipment only for information stored in the custom input/output map 110 and each control information memory (the air conditioning control information memory 22a, the lighting control information memory 24a and the I/O control information memory 26a). Consequently, it is possible to keep the communication burden on the network linking these systems to a minimum.

In this preferred embodiment, the control targets of the air conditioner control device 20 were taken to be air conditioners, lighting devices and I/O equipment. This is but one example, for it would be fine for room entrance management devices and/or the like to also be control targets.

In addition, in this embodiment the equipment connected to the I/O equipment was taken to be a temperature sensor. This is intended to be illustrative and not limiting, for it is also possible for a brightness sensor and/or the like to be connected.

Above, a preferred embodiment of the present invention was explained, but this is intended to be illustrative and not limiting. For example, the functions of the air conditioner control device 20 according to this preferred embodiment can be realized by software and a computer executing such. In this case, the flowchart shown in FIG. 12 is executed by a CPU of this computer.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

This application is based on Japanese Patent Application No. 2010-233846 filed on Oct. 18, 2010. The whole specification, claims, and drawings of Japanese Patent Application No. 2010-233846 are herein incorporated in this specification by reference.

INDUSTRIAL APPLICABILITY

The air conditioner control device, equipment system and program of the present invention are applicable to control of air conditioners.

REFERENCE SIGNS LIST

10 Electrical equipment
20 Air conditioner control device
21 Air conditioner communicator
22 Air conditioning controller
22a Air conditioning control information memory
23 Lighting equipment communicator
24 Lighting controller
24a Lighting control information memory
25 I/O equipment communicator
26 I/O controller
26a I/O control information memory
27 Custom controller
27a Calculation command memory
27b Custom control information memory
28 Input/output map converter
29 Input/output map separator
30 Input device
50 Air conditioner system
60 Lighting system
70 General-purpose I/O system
80 System creator
81 Temperature sensor
82 Ventilation device
101 Air conditioning control information list
102 Lighting control information list
103 I/O control information list
107 Air conditioning control program
108 Lighting control program
109 I/O control program
110 Custom input/output map
111 Basic input/output map
112 Custom control program
501, 502 Air conditioner
601, 602 Lighting device
701, 702 I/O equipment
S1, S2 Space

The invention claimed is:
1. An air conditioner control device for controlling multiple air conditioners connected by a general-purpose network, this air conditioner control device comprising:
an air conditioner communicator that accomplishes communication with the air conditioners;
an interface that receives information used in customizing a control program for controlling the air conditioners;
an air conditioner basic controller provided with an air conditioning basic control program and an air conditioning basic control information memory that is configured to store information used by the air conditioning basic control program, in the air conditioning basic control information memory, basic control contents for the air conditioners not dependent on individual systems are defined in advance;
a basic controller provided with a basic control information memory for storing information used by a basic control program in which basic control contents of equipment of the equipment system not dependent on individual systems are defined in advance, for controlling equipment in the equipment system based on the basic control program;
a custom controller configured to execute the control program;
a custom control program whose control contents are defined by the custom controller;
a custom input/output map that indicates information associated with inputs/outputs of the custom control program among information transmitted and received by the air conditioner communicator; and
an input/output map separator for referencing stored contents of the air conditioning basic control information memory and the basic control information memory, assigning stored information to a basic input/output map and assigning information not stored to the custom input/output map a custom control information memory configured to store information comprising the custom input/output map and the basic input/output map;

wherein the air conditioner communicator is configured to store, in the custom control information memory, information extracted from received signals for information specified by the custom input/output map, and generate signals to be sent based on the information stored in the custom control information memory; and the custom controller is configured to
determine whether the custom control information memory stores information for an air conditioner;
when the custom control information memory is determined to store information for the air conditioner:
acquire input from the custom control information memory in accordance with the information associated with the input/outputs of the custom input/output map from among the information transmitted and received by the air conditioner communicator,
accomplish, using the input acquired from the custom control Information memory, calculations based on the custom control program, and
output calculations results to the custom control information memory;
when the custom control information memory is not determined to store information for the air conditioner, use the air conditioner basic controller for the air conditioner.

2. The air conditioner control device according to claim 1, further comprising a system communicator for sending and receiving signals in order to control equipment of an equipment system via a local network;

wherein the custom input/output map associates a portion of the information transmittable and receivable by the system communicator with inputs/outputs of the custom control program; and the system communicator stores in the custom control information memory information extracted from received signals, for information specified by the custom input/output map, and generates signals to be sent based on information stored in the custom control information memory.

3. The air conditioner control device according to claim 2, wherein:

the air conditioner communicator is provided with an air conditioning control information list containing information for bit lengths necessary in storing various information;

the system communicator is provided with a system control information list containing information for the bit lengths necessary in storing various information; and the custom controller stores information defined by the custom input/output map based on the air conditioning control information list and the system control information list in the custom control information memory, organized by bit length.

4. The air conditioner control device according to claim 3, further comprising an input/output map converter for arranging the custom input/output map input from the interface in an order matching the storage order in the custom control information memory, based on the air conditioning control information list;

wherein the air conditioner communicator and the system communicator read values of the custom control information memory or write values to the custom control information memory from a lead address in which each bit-length of information is arranged in the custom control information memory and the arrangement order of the custom input/output map.

5. The air conditioner control device according to claim 2, wherein the air conditioner communicator stores information extracted from the received signals in the air conditioning basic control information memory and generates a signal to be transmitted based on information stored in the air conditioning control information memory, for information used by the air conditioning basic control program;

the air conditioner basic controller reads contents of the air conditioning basic control information memory, and outputs to the air conditioning basic control information memory calculation results based on the predefined air conditioning basic control program; and the custom controller possesses the basic input/output map in which information stored in the air conditioning basic control information memory and inputs/outputs of a custom control program are associated together, out of information transmittable and receivable by the air conditioner communicator, acquires inputs from the air conditioning basic control information memory in accordance with associations to the basic input/output memory, accomplishes calculations based on the custom control program and outputs calculation results to the air conditioning basic control information memory.

6. The air conditioner control device according to claim 5, wherein the system communicator stores information extracted from the received signals in the basic control information memory and generates the signal to be transmitted based on information stored in the basic control information memory, for information used by the basic control program;

the basic controller reads contents of the basic control information memory, and outputs to the basic control information memory calculation results based on the predefined basic control program;

the basic input/output map associates information stored in the basic control information memory and inputs/outputs of the custom control program, out of the information transmittable and receivable by the system communicator; and the custom controller acquires inputs from the basic control information memory in accordance with associations to the basic input/output memory, accomplishes calculations based on the custom control program and outputs calculation results to the basic control information memory.

7. The air conditioner control device according to claim 6, wherein:

the interface receives input/output maps associating information transmittable and receivable by the air conditioner communicator and the system communicator, with the custom control program and inputs/outputs of the custom control program.

8. The air conditioner control device according to claim 5, wherein the air conditioner communicator:

stores either information extracted from control signals spontaneously transmitted from the air conditioners or information extracted from response signals after transmitting request signals to the air conditioners;

stores in the custom control information memory only information specified by the custom input/output map, for information extracted from signals transmitted at fixed intervals by the air conditioners, out of receivable information other than information stored in the air conditioning basic control information memory; and stores information extracted from the response signals after transmitting at fixed intervals only request signals for information specified by the custom input/output map, based on information extracted from response signals to request signals transmitted to the air conditioners, and does not transmit other request signals.

9. The air conditioner control device according to claim 5, wherein the system communicator:

stores either information extracted from control signals spontaneously transmitted from the equipment of the equipment system or information extracted from response signals after transmitting request signals to the equipment;

stores in the custom control information memory only information specified by the custom input/output map, for information extracted from signals transmitted at fixed intervals by the equipment of the equipment system, out of receivable information other than information stored in the air conditioning basic control information memory; and stores information extracted from the response signals after transmitting at fixed intervals only request signals for information specified by the custom input/output map, based on information extracted from response signals to request signals transmitted to the equipment of the equipment system, and does not transmit other request signals.

10. The air conditioner control device according to claim 5, wherein:

the custom controller is provided with a calculation command memory in which a process has been pre-defined for returning as an output value calculation results when a prescribed calculation has been made on an input value; and the custom control program is comprised of (i) the calculation command ID specifying calculations stored in the calculation command memory, (ii) an input ID identifying one of the individual systems including the air conditioners connected to the general-purpose network, in which the acquisition source of the value to be input is expressed by an input/output ID of the custom input/output map or the basic input/output map, and (iii) an output ID identifying one of individual systems which is different from the individual systems identified by the input ID, in which the setting destination of the output value is expressed by an input/output ID of the custom input/output map or the basic input/output map.

11. The air conditioner control device according to claim 2, wherein the custom input/output map is such that a process ID indicating whether information is acquirable by either the air conditioner communicator or the system communicator and an information ID indicating whether information is acquirable by the air conditioner communicator or the system communicator specified by the process ID are defined as a set for inputs/outputs of the custom control program.

12. The air conditioner control device according to claim 11, wherein the custom input/output map is such that the process ID, the information ID, an equipment ID identifying air conditioners comprising an air conditioning system that is a transmission source of information, or equipment ID identifying equipment of the equipment system, are defined as a set for inputs/outputs of the custom control program.

13. An equipment system provided with the air conditioner control device of claim 1.

14. The air conditioner control device according to claim 1, wherein:

the custom controller is provided with a calculation command memory in which a process has been pre-defined for returning as an output value calculation results when a prescribed calculation has been made on an input value; and the custom control program used to accomplish the calculations comprises a plurality of entries, each entry in the custom control program comprises (i) the calculation command ID specifying one calculation of a plurality of calculations stored in the calculation command memory; (ii) at least one input ID, the at least one input ID identifies an acquisition source of the value to be input to the one calculation, each one input ID is one input/output ID of the custom input/output map and the basic input/output map, the acquisition source is one of the individual systems including the air conditioners connected to the general-purpose network; and (iii) one output ID, the output ID is one input/output ID of the custom input/output map and the basic input/output map, the output ID identifies the setting destination of the output value, the setting destination is one of the individual systems including the air conditioners connected to the general-purpose network, the setting destination is different from the acquisition source;

the custom controller is further configured to control the setting destination identified in the custom control program according to the output value resulting from the one calculation.

15. A non-transitory recording medium on which is recorded a program for causing a computer controlling multiple air conditioners connected to a general-purpose network to execute:

a procedure for controlling the air conditioners, via an air conditioner basic controller, based on air conditioning basic control program in which basic control contents of the air conditioners not dependent on individual systems are defined in advance;

a procedure for controlling equipment in the equipment system, via a basic controller, based on basic control program in which basic control contents of equipment of the equipment system not dependent on individual systems are defined in advance;

a procedure for referencing stored contents of an air conditioning basic control information memory and a basic control information memory via an input/output map separator, assigning stored information to a basic input/output map and assigning information not stored to a custom input/output map via the input/output map separator;

a procedure for storing, via an air conditioner communicator, in a custom control information memory information extracted from a received signal, for information specified by the custom input/output map and the basic input/output map, wherein the custom input/output map indicates information associated with inputs/outputs of a custom control program among information transmitted and received by an air conditioner communicator;

a procedure for generating, via the air conditioner communicator, the signal to be sent based on information stored in the custom control information memory;

a procedure for determining, via a custom controller, whether the custom control information memory stores information for an air conditioner;

when the custom control information memory is determined, via the custom controller, to store information for the air conditioner:

acquire, via the custom controller, input from the custom control information memory in accordance with the information associated with the inputs/outputs of the custom input/output map, accomplish, using the input acquired from the custom control information memory and via the air conditioner custom controller, calculations based on the custom control program, and output, via the custom controller, calculations results to the custom control information memory;

when the custom control information memory is not determined to store information for the air conditioner, use the air conditioner basic controller for the air conditioner.

16. An air conditioner control device for controlling multiple air conditioners connected by a general-purpose network, this air conditioner control device comprising:

an air conditioner communicator that communicates with the air conditioners;

an interface that receives information which customizes a control program that controls the air conditioners;

an air conditioner basic controller provided with an air conditioning basic control program and an air conditioning basic control information memory that is configured to store information used by the air conditioning basic control program, in the air conditioning basic control information memory, basic control contents for the air conditioners not dependent on individual systems are defined in advance;

a basic controller provided with a basic control information memory for storing information used by a basic control program in which basic control contents of equipment of the equipment system not dependent on individual systems are defined in advance, for controlling equipment in the equipment system based on the basic control program;

a custom controller configured to execute the control program;

a custom control program whose control contents are defined by the custom controller;

a custom input/output map that indicates information associated with inputs/outputs of the custom control program among information transmitted and received by the air conditioner communicator; and an input/output map separator for referencing stored contents of the air conditioning basic control information memory and the basic control information memory, assigning stored information to a basic input/output map and assigning information not stored to the custom input/output map;

a custom control information memory that stores information comprising the custom input/output map and the basic input/output map;

wherein the air conditioner communicator is configured to:

determine whether the custom control information memory stores information for an air conditioner;

extract information from signals received from the air conditioners;

store in the custom control information memory the information extracted from a received signal for information specified by the custom input/output map when the custom control information memory is determined to store information for the air conditioner specified in the received signal, and generate a signal to be sent to the air conditioner based on the information stored in the custom control information memory when the custom control information memory is determined to store information for the air conditioner to which the signal is to be sent; and the custom controller is configured to determine whether the custom control information memory stores information for an air conditioner;

when the custom control information memory is determined to store information for the air conditioner:

acquire input from the custom control information memory in accordance with the information associated with the inputs/outputs of the custom input/output map from among the information transmitted and, received by the air conditioner communicator, accomplish, using the input acquired from the custom control information memory, calculations based on the custom control program, and output calculations results to the custom control information memory;

when the custom control information memory is not determined to store information for the air conditioner, use the air conditioner basic controller for the air conditioner.

* * * * *